United States Patent
Pearson et al.

(10) Patent No.: US 6,885,733 B2
(45) Date of Patent: Apr. 26, 2005

(54) METHOD OF PROVIDING A USER INTERFACE FOR AUDIO TELECOMMUNICATIONS SYSTEMS

(75) Inventors: Gwen L. Pearson, Yardley, PA (US); Benjamin L. Somberg, Laytonsville, MD (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/012,113

(22) Filed: Dec. 3, 2001

(65) Prior Publication Data

US 2003/0103608 A1 Jun. 5, 2003

(51) Int. Cl.⁷ .............................................. H04M 1/64
(52) U.S. Cl. ................... 379/76; 379/88.18; 379/88.23; 455/412.1
(58) Field of Search ......................... 379/88.23, 88.18, 379/88.01, 88.04, 72, 76, 88.17, 88.19, 88.22; 455/412.1; 725/60, 61

(56) References Cited

U.S. PATENT DOCUMENTS

| | | |
|---|---|---|
| 4,932,021 A | 6/1990 | Moody |
| 5,272,748 A | 12/1993 | Davis |
| 5,559,945 A | 9/1996 | Beaudet et al. |
| 5,703,935 A | 12/1997 | Raissyan et al. |
| 5,764,960 A * | 6/1998 | Perks et al. .................. 345/841 |
| 5,771,276 A * | 6/1998 | Wolf ........................ 379/88.16 |
| 5,802,526 A | 9/1998 | Fawcett et al. |
| 5,815,145 A * | 9/1998 | Matthews, III ............... 725/41 |
| 5,818,908 A | 10/1998 | Kaplan |
| 5,864,605 A | 1/1999 | Keshav |
| 5,946,377 A | 8/1999 | Wolf |
| 5,982,875 A | 11/1999 | Lieben et al. |
| 6,014,428 A | 1/2000 | Wolf |
| 6,016,336 A | 1/2000 | Hanson |
| 6,061,433 A * | 5/2000 | Polcyn et al. ............. 379/93.12 |
| 6,111,940 A * | 8/2000 | Kugell ................... 379/210.01 |
| 6,173,042 B1 * | 1/2001 | Wu .......................... 379/88.04 |
| 6,366,650 B1 * | 4/2002 | Rhie et al. ................ 379/88.13 |
| 6,408,437 B1 * | 6/2002 | Hendricks et al. ........... 725/132 |
| 6,477,240 B1 * | 11/2002 | Lim et al. ................... 379/67.1 |
| 6,487,277 B1 * | 11/2002 | Beyda et al. ............. 379/88.01 |
| 6,501,832 B1 * | 12/2002 | Saylor et al. ............. 379/88.04 |
| 6,516,323 B1 * | 2/2003 | Kamba ..................... 707/104.1 |

FOREIGN PATENT DOCUMENTS

| | | |
|---|---|---|
| EP | 0 973 314 | 1/2000 |
| JP | 1268247 | 10/1989 |
| JP | 10049185 | 2/1998 |

* cited by examiner

*Primary Examiner*—Fan Tsang
*Assistant Examiner*—Ming Chow (57) ABSTRACT

A network method for using interactive voice response (IVR) for telecommunication. Voice menu options for a menu level with a voice menu hierarchy are played to a caller. Each menu option can be a voice segment that is audibly played to the caller. The IVR system receives control input in which a second plurality of menu options are received. The menu options in the second plurality are selected from any of the previously presented individual menu options. The selected menu options can be temporarily saved in a memory location in the IVR system. The IVR system can retrieve the selected menu options from the memory location. The second plurality of menu options for the menu level is played to the caller to give the caller control over which part or parts of the menu options are to be repeated.

23 Claims, 6 Drawing Sheets

METHOD OF PROVIDING A USER INTERFACE FOR AUDIO TELECOMMUNICATIONS SYSTEMS

FIELD OF THE INVENTION

The present invention generally pertains to the field of telecommunications voice processing and, more particularly, to a method and system for navigating a menu of options for a telephony device.

BACKGROUND OF THE INVENTION

Interactive Voice or Touch-tone Response (IVR) user interfaces have been a popular way of enabling callers to obtain computerized information from a database or to be directed to a department within a company without the assistance of a live operator. Many businesses incorporate these services to reduce costs. In spite of the many benefits of these types of services, there has been a continual resistance by callers to using these conventional systems and many callers are greatly frustrated by these IVR systems.

Conventional IVR services typically operate by having a recorded message that presents a list of choices or menus to the caller for call routing options and allows callers access to varying products and services. The caller uses the touch-tone keypad or voice inputs to enter or say the digit associated with the desired options and the service responds accordingly. Often, the options are arranged in hierarchical layers of menus. A caller is required to navigate these layers of menus to find the desired option. Many such services allow callers to "barge in" on the recorded message by making a response before the message is finished. However many callers, including first time or infrequent callers, do not know the available options or the option number or keyword associated with the correct option. These callers must listen to the entire message before a response can be made in order to make the best match between their request and the options available.

A common frustration experienced by callers concerns reaching the end of the menu message and not being able to recall the number(s) or option associated with the desired response. A caller attempting to navigate through a hierarchical menu may believe that an option is the desired choice, but he or she is not absolutely certain. The caller can try the response that is thought to be the correct one, but the consequences of this action are often unpleasant. The caller may be directed to the wrong party or the wrong branch of the menu structure and must somehow retrace his or her steps through the menus. Unfortunately, the caller may end up disconnecting and re-dialing the entire telephone number. In a popular attempt to solve this problem, conventional Interactive Voice Response user interfaces provide a menu option for the caller to have the full message menu repeated with each option in its entirety. This attempt is ineffective, because the caller is forced to listen to the entire menu again. This approach wastes the time of the caller and can lead to further dissatisfaction.

U.S. Pat. No. 6,016,336 to Hanson (hereinafter '336 patent) presents yet another possible solution. Under the '336 patent, the voice response system (VRS) learns individual caller behavior from prior visits to the VRS. The system stores the caller's unique identifier and a menu option selected by the caller in response to a menu manuscript. For subsequent calls by the caller to the system, the caller is presented with a menu manuscript based on the previous usage history that allows the caller to access the desired menu. Although this may reduce the number of menus a caller may have to navigate through, this method is less effective if the caller is a first-time caller to the system or if the caller wishes to deviate from his or her normal pattern of use.

U.S. Patent Application Publication No. 20010014146 by William et al. presents an interactive voice response system, which stores the most frequently selected prompts of a caller who has previously visited the system. For subsequent calls by the caller to the system, the order of menu presentation is updated based on the previous frequency of use. The caller must call back to the system subsequent times for the menu to change. This system provides no accommodation for first-time callers for updating the presentation order. While this system may reduce overhead costs to businesses by not having to provide dedicated live operators, such a system may result in loss of time, increased customer frustration, and the possibility of lost customers for first-time callers.

SUMMARY OF THE INVENTION

The present invention pertains to navigating a menu hierarchy of a call management system by providing a method for processing a telephone call for a voice response system (VR) or an interactive voice response system (IVR) for telecommunication systems.

In one aspect of the present invention, there is provided a method of processing a telephone call for a voice response system. In accordance with the method, a first plurality of menu options for a menu level with a menu hierarchy are transmitted to a caller. The first plurality of menu options has a predetermined presentation order. Each menu option in the first plurality of menu options is an audio-generated segment that is played to the caller. The telephone call is monitored for a control input from a caller or user. The voice response system receives the control input. In response to receiving the control input, the system transmits a second plurality of menu options which are selected from the first plurality of menu options for the menu level. In accordance with the method, the second plurality of menu options have a presentation order different from the predetermined presentation order of the first plurality. In this manner, the system can selectively present option messages in a user-specified order.

In another aspect of the present invention, the second plurality of menu options are stored in a memory of the voice response system. In another aspect, the second plurality of menu options are transmitted based on a received sequence of the selected second plurality of menu options. In yet another aspect, the selected second plurality of menu options can be transmitted based on a predetermined numerical sequence of the options. In another aspect, the control input can be a verbal input and the voice response system can parse the verbal input for command words. In another aspect, the system receives input to selectively change the characteristic of the audio-generated options so that the caller can hear the selected second plurality in a voice profile different from the first plurality of menu options. In another aspect, the voice response system can be network-based provided by a telecommunications provider.

The present invention improves a caller or user experience associated with the use of interactive voice or touch-tone response user interfaces for telecommunication systems. The features reduce the time navigating through layers of menu hierarchy, reduce caller frustration and lower on-air costs for wireless communication devices. Further, the features permit direct and rapid connections between, for example, buyers and sellers of goods and/or services, thus reducing lost business due to caller frustration associated with conventional IVR user interfaces. In particular, the features of the present invention permit callers to ascertain the menu options to products and/or services without repeating unnecessary menus options.

BRIEF DESCRIPTION OF THE DRAWINGS

The foregoing summary of the invention, as well as the following detailed description of the preferred embodiments, is better understood when read in conjunction with the accompanying drawings, which are included by way of example and not by way of limitation with regard to the claimed invention:

DETAILED DESCRIPTION OF THE PREFERRED EMBODIMENTS

Before beginning a detailed description of the invention, it should be noted that, in the detailed description to follow, example embodiments and values may be given, although the present invention is not limited thereto.

Figure 1:
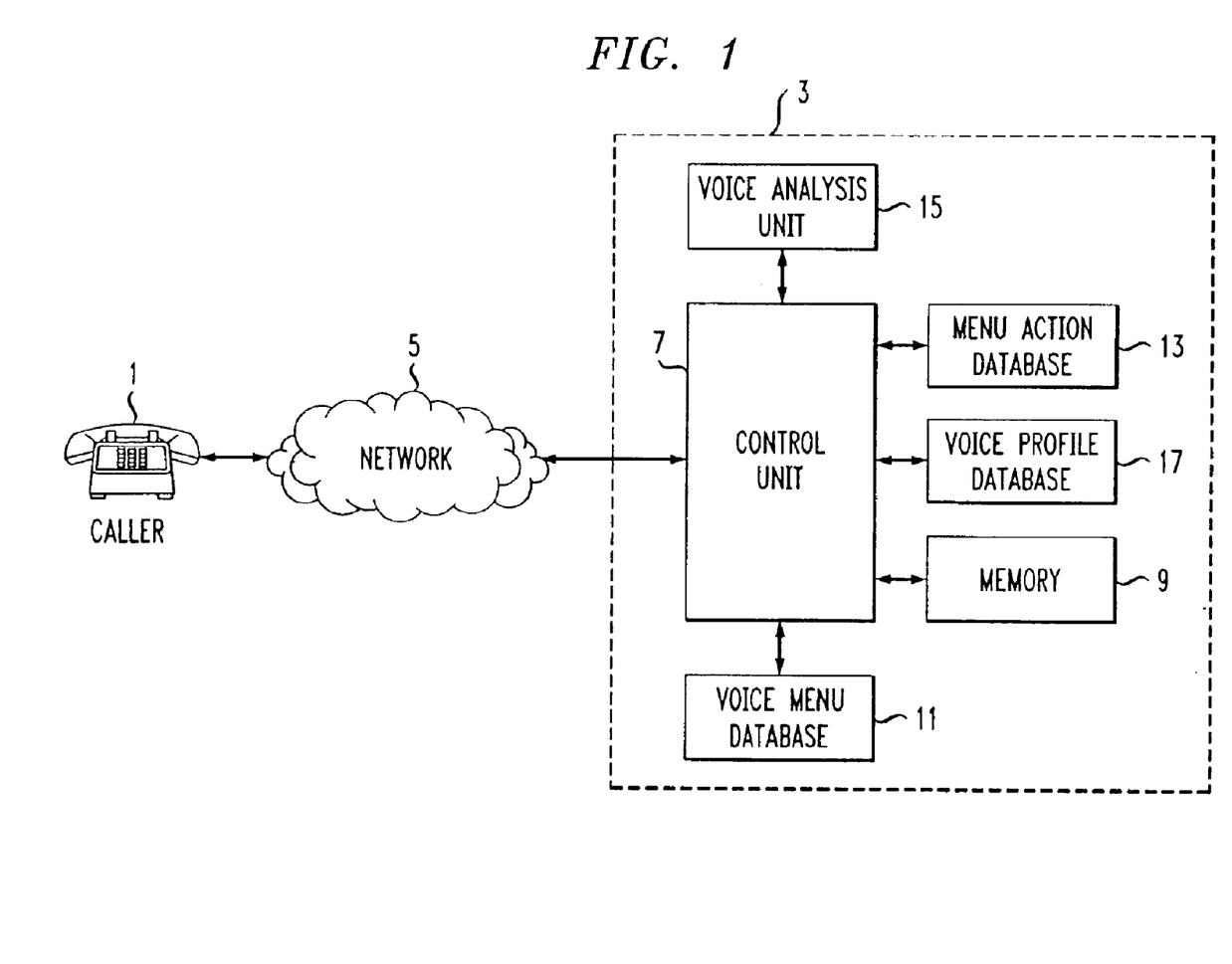
FIG. 1 is a schematic diagram of a network environment utilized by example embodiments of the present invention.

Referring to FIG. 1, an embodiment of the present invention is shown in a schematic block diagram. A caller/calling party 1 (hereafter referred to as the "caller") dials an intended/called party using, for example, a telephone, whether wired or wireless, or computer or any other terminal used for telephony purposes. Caller 1 can access a call processing system 3 using a telecommunications access network 5. Telecommunications access network 5 may include a plurality of differing networks, such as a local, national, or international telecommunications network; a paging, cellular, or Personal Communication Services (PCS) network; an Internet (VoIP); cable television and/or any other suitable networks. While the embodiments described below relate to communications networks including a Public Switched Telephone Network (PSTN), a wireless telecommunications network, a broadband network, a CATV network, a satellite telecommunications network, Internet, a private branch exchange system, or a wireless Centrex system, it is to be understood that the present invention can be applied to all types of communications systems and networks. While FIG. 1 shows a single caller, system 3 can simultaneously process telephone calls from a multiplicity of callers.

Call processing system 3 can be provided for access about information to a plurality of products, services, and/or departments. Without limitation, the information can be anything that is used with IVR systems. The call processing system includes a control unit 7. A call initiated by caller 1 may be received at control unit 7 via the access network 5. Control unit 7 may then present caller 1 with a plurality of options to access a predetermined voice menu in accordance with the present invention. Where the caller chooses to navigate through the predetermined menus, the caller is presented with a list of menu choices in accordance with the teachings of the present invention.

With continued reference to FIG. 1, control unit 7 includes hardware and software for controlling and directing the system 3. Control unit 7 can receive any form of input that a general call processing system uses such as, but not limited to, a dual tone multi-frequency ("DTMF") signal (touch-tone), verbal codewords, or keyboard input. Control unit 7 may be a computing device configured with one or more central processing units (not shown), a system memory 9, and a system bus (not shown) that couples various system components including the system memory to the central processing unit. The system bus may be any one of several types of conventional bus structures. The computing device uses any number of operating system such as MICROSOFT WINDOWS®, WINDOWS NT®, WINDOWS XP®, UNIX®, or LINUX®. The system memory 9 includes read only memory ("ROM") and random access memory ("RAM"). Such a computing device is regularly used for interactive voice response systems or touch-tone response systems.

Figure 2:
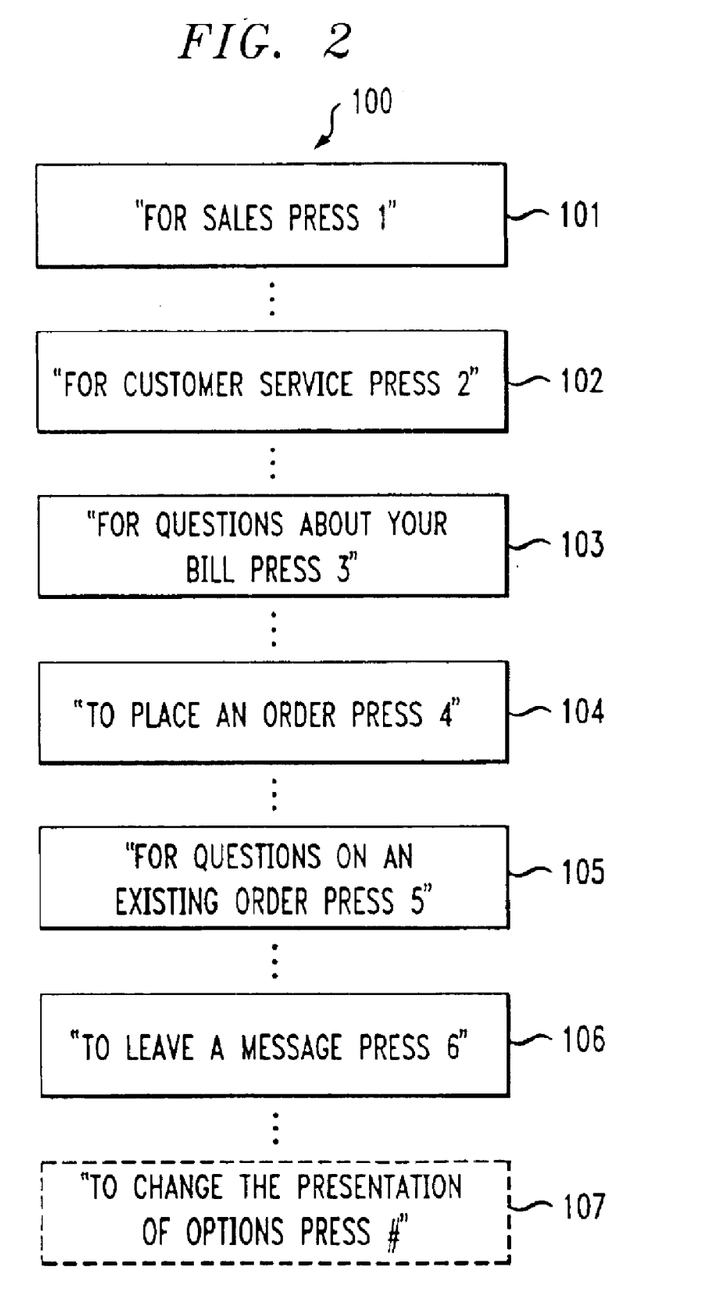
FIG. 2 is a schematic representation of a menu announcement structure according to an embodiment of the present invention.

As illustrated in FIG. 1, in a preferred arrangement, call processing system 3 further includes a voice menu database 11 operatively coupled to control unit 7. Voice menu database 11 serves to retain and provide a plurality of menu level messages (see FIG. 2) for use by the control unit 7. As shown in FIG. 2, for illustration purposes, a menu announcement structure 100 is associated with a menu level message within the hierarchical voice menu. It should be appreciated that the hierarchical voice menu includes several related submenu level messages. According to an embodiment of the invention, each menu level message is composed of a plurality of option messages or user selectable options 101, 102, 103, 104, 105, 106 and 107 that are formed in a way that enables direct access to each option contained within a menu level message. Each menu level message is stored as at least N separate options, in which each option comprises at least one audio segment (where N equals the number of options contained in the menu level message). If desired, each menu message can be maintained in separate computer-readable data files. Alternatively, a menu message can be in a database look-up table in which an index pointer can be used to indicate which message should be presented within the menu level message. It should be recognized that each option can be recorded as one segment or as more than one recorded segment in a concatenated arrangement. Therefore, each option may be comprised of several recordings—where parts of the recordings are reused for other announcements.

It should be recognized that the options messages may be audio-generated, such as a prerecorded type using a human voice, a synthesized type by changing the tonal characteristics of a human voice, or a synthesized type by using text-to-speech technology. In an embodiment of the invention, a text-to-speech engine (TTS) may be incorporated in the control unit 7 to present the menu messages in a synthesized voice or speech. Alternatively, the TTS can be a separate system and the output of the TTS can be fed into control unit 7. In one arrangement, the TTS may access a database 17 that stores a plurality of voice profiles for selectively synthesizing the option message as chosen by a caller (FIG. 1). The TTS and the voice profiles can be provided from AT&T Labs Natural Voices™ Text-To-Speech software.

Referring to FIGS. 1 and 2, in one embodiment, each option message 101–107 is stored in voice menu database 11. Voice menu database 11 may be a computer-readable storage device having one or more magnetic disk drives or, alternatively, optical disk drives, such as Compact Disk ROMs, or DVD drives. It should be understood that the computer-readable storage device and the associated computer-readable media provide nonvolatile storage of computer-readable codes that can also retain data structures, program modules and other data for call processing system 3. In addition, other types of computer-readable media can be accessible by call processing system 3, such as magnetic cassettes, flash memory cards, random access memories ("RAMs"), read only memories ("ROMs"), and the like.

Referring to FIG. 1, call processing system 3 may further include a menu action database 13 that retains a plurality of specific actions or commands logically mapped to each option message for execution by control unit 7. Menu action database 13 can be any conventional method for action mapping of options in a IVR. One such method is disclosed in U.S. Pat. No. 5,864,605 to Keshav, which is herein fully incorporated by reference. Similar to voice menu database 9, menu action database 13 may be a computer-readable storage device.

With reference to FIG. 1, in an embodiment of the invention, call processing system 3 further includes a voice analysis unit 15 which enables a caller 1 to provide verbal inputs in the form of a code word or a phrase related to an option message. In use, control unit 7, recognizing that the caller provided a verbal input may alert a voice analysis unit (VAU) 15. Voice analysis unit 15 operates in a conventional manner. If verbal inputs are utilized, VAU 15 may parse the spoken entries where appropriate. VAU 15 may use a variety of conventional techniques for parsing the verbal inputs to be processed by control unit 7.

For the purposes of explaining the present invention, as can be seen in FIG. 2, an example voice menu is used by a business enterprise for the benefit of callers seeking information and direction. In the example, the business enterprise offers customers the option to be transferred or otherwise routed to sales, customer service, billing, placing orders, questions about an existing order, or leaving a voice mail message for the business enterprise. When the caller initially places the call to the company, call processing system 3, with control unit 7 and voice menu database 11, plays a first menu level message back to the caller to indicate which buttons begin a respective path through the hierarchical menu (not shown). The caller will be prompted with the following six option messages: Message 101 states "For sales press 1"; Message 102 states "For customer service press 2"; Message 103 states "For questions about your bill press 3"; Message 104 states "To place an order press 4"; Message 105 states "For questions on an existing order press 5"; and Message 106 states "To leave a message press 6". An optional Message 107 (shown in the dotted box on FIG. 2) states "To change the presentation of options, press #." The use of the example voice menu will be explained in conjunction with methods of call processing shown in FIGS. 3 and 5.

An embodiment of a method of the present invention will be described with reference to the flowchart shown in FIG. 3. A call is processed with a menu system of voice options in which the caller can selectively change the presentation order of repeated option messages or selectively repeat the option messages in a user-identified order during a telephone call. Implementation of an example embodiment of the present invention begins with step 201 in FIG. 3, whereby the call processing system receives the call. It is assumed that the intended/called party (hereafter referred to as the "called party") is connected to the call processing system. In addition, the called party could be a business department or information retrieval system, such as a bank teller application. Further, the call processing system may be a PSTN-based system that is provided by a telephone service provider or it may be based within a private branch exchange (hereafter referred to as "PBX"), which includes private telephone systems within a business enterprise. The telephone network, whether public or private, is depicted in FIG. 1 as numeral 5.

Figure 3:
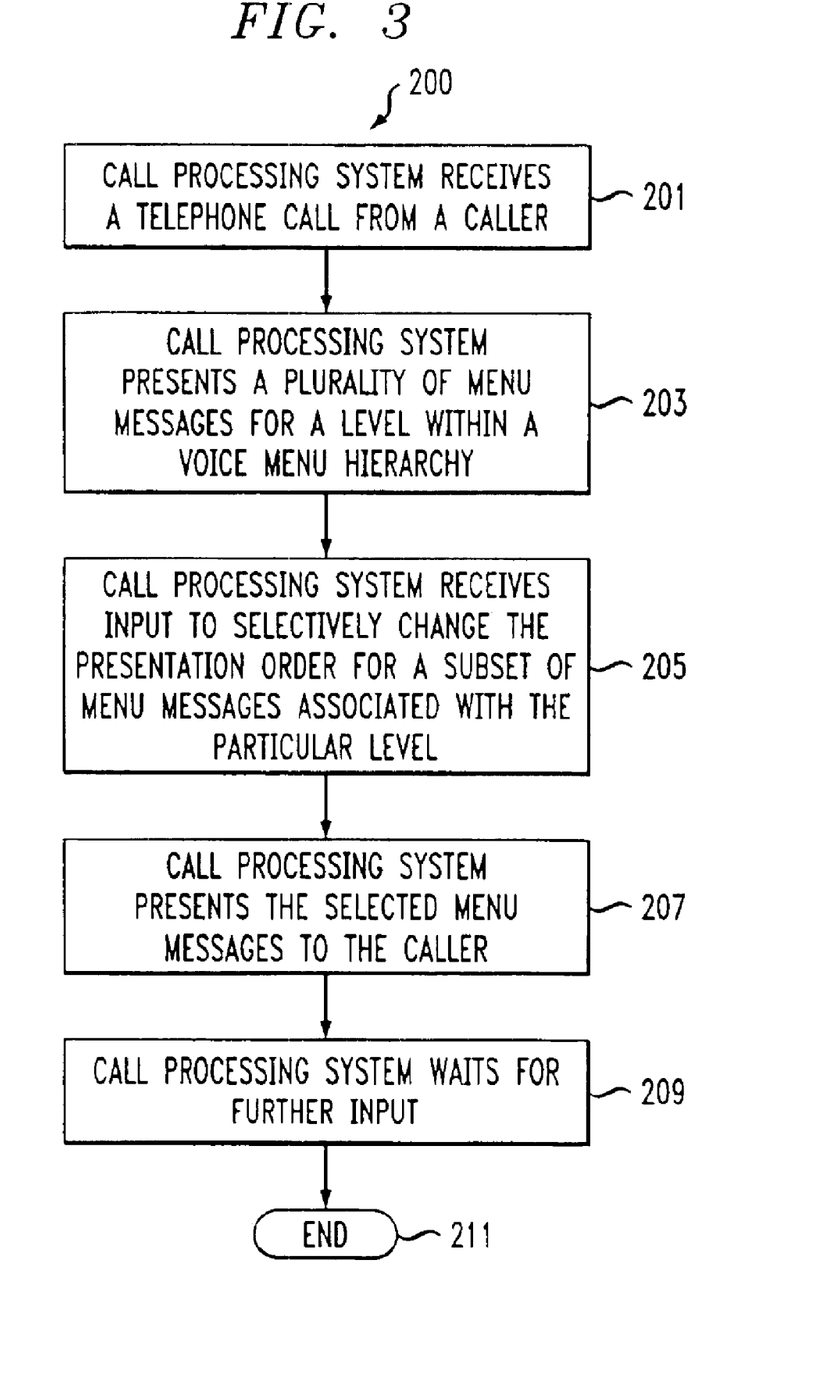
FIG. 3 is a flowchart illustrating an embodiment of a method of processing a call according to the present invention.

With continued reference to FIG. 3, in block 203, call processing system 3 audibly presents or otherwise transmits a plurality of menu messages for a level within the voice menu hierarchy. According to an embodiment of the present invention, in block 205, call processing system 3 receives input from the caller to selectively change the presentation order for menu messages associated with the particular menu level message. In a preferred embodiment, the caller is enabled to selectively change the presentation order for a subset of menu messages for the particular level. The subset can be at least one option less than the number of options previously presented. For first-time callers or callers not familiar with the system, at least one of the options (107 on FIG. 2) would explicitly state how the system operates to selectively change the presentation order for menu messages. The selected options are temporarily stored in system memory 9 of call processing system 3. Control unit 7 is enabled to access the system memory for eventual playback of the selected options to the caller. If desired, the options selected by the caller can be confirmed by the system 3. If not confirmed, then the caller can re-select the desired options for playback.

Figure 4:
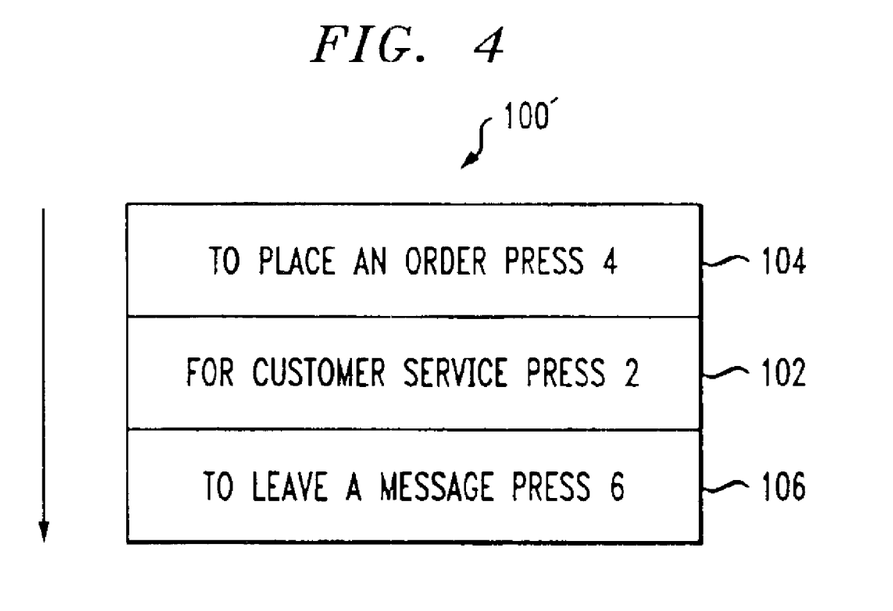
FIG. 4 is a schematic representation of an example menu announcement structure according to the embodiment shown in FIG. 3.

Using the previous example of the business enterprise voice menu shown in FIG. 2, after the six option messages are played, caller 1 is enabled to select any of the option messages for playback. In the example menu announcement structure 100' shown in FIG. 4, it is assumed that the caller has selected options message 104, 102, and 106 for playback in that particular order. Accordingly, in this case, the caller initiates the adjustment of the presentation order of the option messages for the particular subset, while the caller is using the call processing system. It should be appreciated that although the initial presentation order of the menu stays unchanged, the caller is enabled to have enhanced control of the re-presentation of specific options of the menu level message while being connected to the system. In particular, the caller can select fewer option messages for re-presentation, rather than the entire options messages of the level. In the example of FIG. 4, three options were selected for playback, rather than all six options.

With continued reference to FIG. 3 and block 203, the call processing system can receive caller/user-initiated control input, such as a sequence of DTMF digits and/or control keys to invoke the mode to selectively change the presentation order for a subset of menu messages. In the example, a "*" button or "#" button followed by the sequence of digits for playback can be inputted by the caller, such as "*, 4, 2, 6". In addition, the "*" button or "#" may be followed by input code, such as "*H". Alternatively, the caller/user-initiated control input can be a speaker-independent voice command implemented for keywords or key phrases based on verbal input, such as "replay options 4, 2, and 6". Voice analysis unit 15 receives, parses, and sends the parsed commands to control unit 7 for action. Nevertheless, the caller may enter commands before or during the initial presentation of the list of options depending on the capabilities of the system. This can be accomplished by call processing system 3 equipped with barge-in capability. It should be appreciated that the present invention can also play back the selected option messages in numerical order (e.g., options 102, 104, 106). The numerical order can be from the lowest ordinal option number to the highest ordinal option number (e.g., the first options are played before the last options). This is useful to a caller when the first few options played in the initial menu are somewhat vaguely recalled, but they were not sure. Alternatively, the numerical order can be from the highest to the lowest ordinal option number.

Referring to the method shown in FIG. 3, in block 207, call processing system 3 presents or otherwise plays back the selected menu messages to the caller. This can be accomplished by control unit 7 accessing system memory 9 and matching the selected options against the voice menu database 11. In block 209, call processing system waits for further input from the caller. In block 211, depending on the selection of the caller, the call processing can end or perform other actions and processes as stored in menu action database 13. In this manner, a first-time caller or other callers to an interactive voice response system or voice mail system can have an improved experience of navigating the menu system. In addition, the usability of a traditional interactive voice response system is improved.

An alternative embodiment of a method of the present invention will be described with reference to the flowchart shown in FIG. 5. A call is processed with a menu system of voice options in which the caller can selectively cause call processing system 3 to present a sequential subset of option messages starting at a selected option message. Implementation of an example embodiment of the present invention begins with step 301 in FIG. 5, in which the caller dials an intended/called party and the call processing system receives the call. In block 303, call processing system 3 presents or otherwise transmits a plurality of menu messages for a level within the voice menu hierarchy.

In a preferred embodiment of the present invention, in block 305, call processing system 3 receives input from the caller to selectively present a sequential subset of option messages starting at a selected option message associated with the particular menu level message. The selected option is temporarily stored in system memory 9 of call processing system 3. Control unit 7 is enabled to access the system memory for eventual playback of the selected option and the subsequent options to the caller. If desired, the selection of the caller can be confirmed by the system 3. If not confirmed, then the caller can re-select the option menus. In a further embodiment, for first-time callers or callers not familiar to the system, at least one of the options (107) would explicitly state how the system operates to enable the caller to selectively present a sequential subset of option messages.

Figure 6:
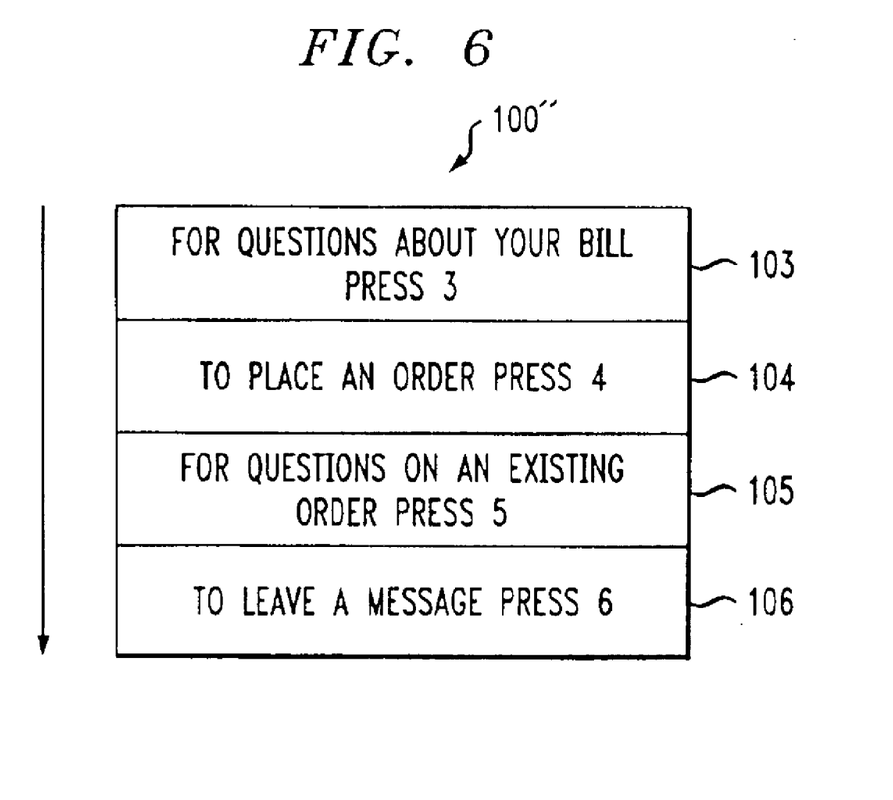
FIG. 6 is a schematic representation of an example menu announcement structure according to the embodiment shown in FIG. 5.

Referring to the example of the business enterprise voice menu shown in FIG. 2, after the six option messages are played, caller 1 can select any of the options for playback. In the example menu announcement structure 100" shown in FIG. 6, it is assumed the caller has selected option 103 to start the playback of the option messages. In such a case, the caller desires to replay options 103–106 (e.g., in sequential order, but selecting a starting option). To receive control input from the caller, call processing system 3 can receive a sequence of DTMF digits and/or control keys to invoke the mode to selectively cause call processing system 3 to present a sequential subset of option messages starting at a selected option message. Alternatively, any number of verbal commands may be implemented to cause the call processing system to invoke the mode, including speaker-independent voice commands or keywords or phrases. There are many possible command-sequences that can be implemented. For example, a voice command sequence can be defined as "repeat menu starting with option X" (where X is the option number, option codeword or other way of designating specific options). Nevertheless, the caller may enter commands before or during the first presentation of the list of options depending on the capabilities of the system. Voice analysis unit 15 would receive and process the voice command sequence according to the teachings of the present invention. It should be recognized that the type of control input is similar to the embodiment described with reference to FIG. 3.

Figure 5:
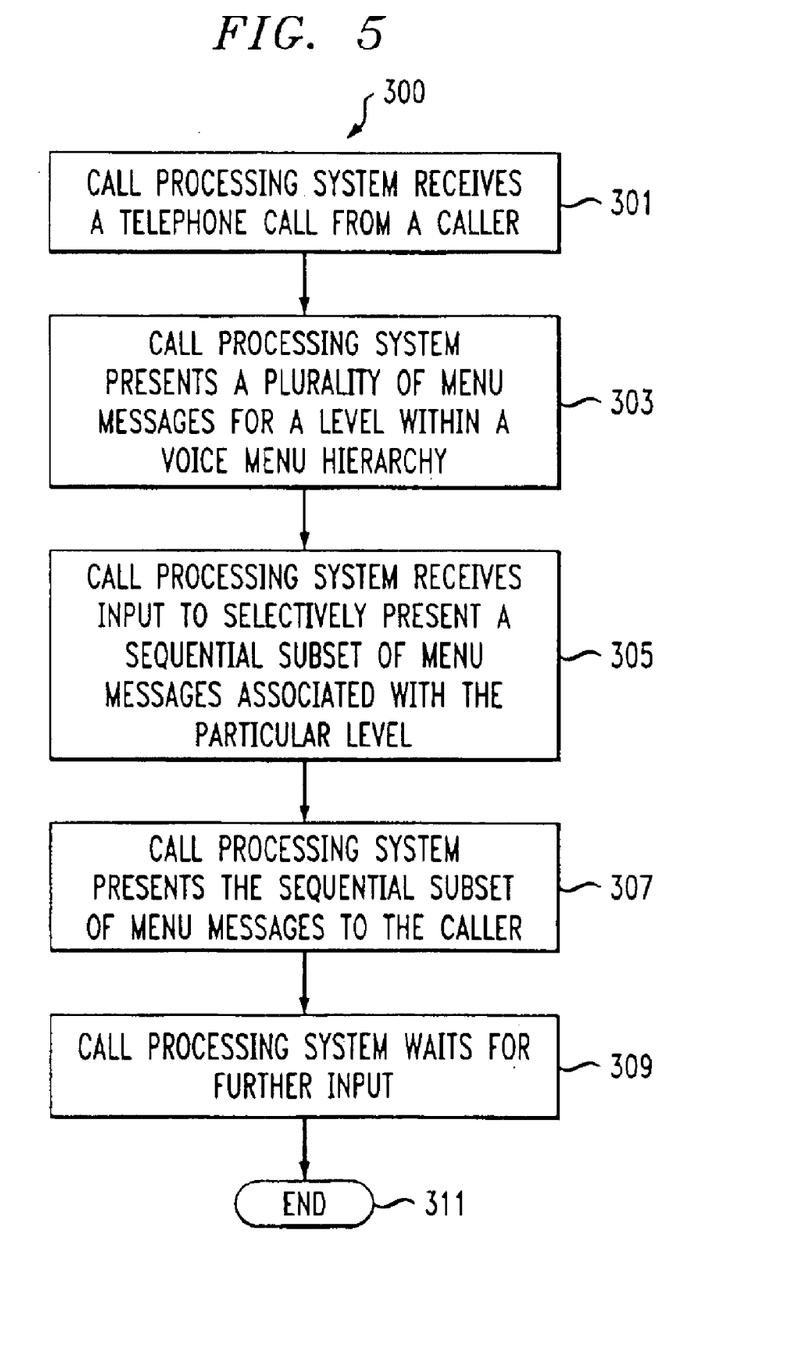
FIG. 5 is a flowchart illustrating an alternative embodiment of a method of processing a call according to the present invention.

Referring to the method shown in FIG. 5, in block 307, call processing system 3 presents or otherwise plays back the selected menu messages to the caller in sequential order for the same level. In block 309, call processing system 3 waits for further input from the caller. In block 311, depending on the selection of the caller, the call processing can end or perform other actions and processes as stored in menu action database 13. In this manner, a first-time caller or other callers to an interactive voice response system or voice mail system can have an improved experience of navigating the menu system.

In a preferred embodiment, the features of the present invention improve the caller's experience by enabling the caller to request a specific option or group of options to be repeated for an interactive voice response system. Additionally, the caller's experience is improved by requesting the message be repeated starting with a specific option. Thus, the caller has much more control over which part or parts of the menu message are to be repeated. This control can be available on all hierarchical menu levels at any time during the caller interaction. In addition, a caller can select the type of voice profile that might be easier to hear and understand for the repeated options.

In an alternative embodiment of the invention, system 3 has functionality to store the most frequently selected options that are requested to be repeated. Upon selective command by the caller, the most frequent option is repeated in audible form to the caller. In addition, the selection frequency information can be used for statistical tracking purposes. In another embodiment, call processing system 3 may present the implicit menu options associated with the menu hierarchy or the particular menu level. The implicit menu options can be repeated along with the second plurality of options as described with reference to FIGS. 3–6. Implicit menu options are generally menu options that are available options for selection by the caller but are not stated in the initial voice menu (e.g., the first plurality of menu options). This feature is useful for callers, including first time or infrequent callers, who do not know the available options of the system.

While the present invention has been described with reference to preferred and exemplary embodiments, it will be understood by those of ordinary skill in the art that various changes may be made and equivalents may be substituted for elements thereof without departing from the scope of the invention. In addition, many modifications may be made to adapt a particular situation to the teachings of the invention without departing from the scope. Therefore, it is intended that the invention not be limited to the particular embodiments disclosed, but that the invention include all embodiments falling within the scope of the appended claims. All United States patents and applications referred to shall be deemed incorporated by reference for all purposes as to their entire contents.

What is claimed is:

1. In a network-based voice response system having a voice menu hierarchy, a method of processing a telephone call, comprising the steps of:
   during the telephone call, transmitting to a caller a first plurality of menu options having a first presentation order for a menu level, in which each menu option in the first plurality of menu options is an audio-generated segment;
   monitoring the telephone call for a control input from the caller which contains a user-defined adjustment of the first presentation order; and
   responsive to receiving the control input from the caller, transmitting a second plurality of menu options to the caller which are selected from the first plurality of menu options for the menu level in which the second plurality of menu options have a second presentation order different from the first presentation order.

2. The method of claim 1, further comprising a step of temporarily storing the second presentation order in a memory of the voice response system.

3. The method of claim 1, wherein the first plurality of menu options have a predetermined voice profile and further comprising a step of adjusting the predetermined voice profile for the second plurality of menu options.

4. The method of claim 1, wherein the second presentation order is based on a received sequence of the selected first plurality of menu options.

5. The method of claim 1, further comprising a step of determining a numerical sequence for the second presentation order.

6. The method of claim 1, further comprising a step of confirming the second plurality of menu options prior to the step of transmitting the second plurality of menu options.

7. The method of claim 1, wherein the second presentation order is based on a previous frequency of selected menu options for the second plurality of menu options.

8. The method of claim 1, wherein the control input comprises a verbal input.

9. The method of claim 8, further comprising a step of parsing the verbal input.

10. The method of claim 1, wherein the audio-generated segment is at least one of a text-to-speech segment and a synthetic voice segment.

11. In an interactive voice response system, a method of processing a telephonecall, comprising the steps of:
   receiving the telephone call from a caller;
   presenting to the caller a first plurality of option messages for a predetermined menu level of an audible menu hierarchy of the interactive voice response system;
   monitoring the telephone call for a caller-initiated selection of a second plurality of option messages with a new order within the predetermined menu level, in which the second plurality of option messages are selected from the first plurality of option messages; and
   presenting the second plurality of option messages of the predetermined menu level during the telephone call to the caller.

12. The method of claim 11, further comprising a step of temporarily storing the second plurality of option messages in a memory.

13. The method of claim 12, further comprising a step of retrieving the second plurality of menu options.

14. The method of claim 11, wherein the step of presenting the second plurality of option messages further comprises presenting the second plurality of option messages based on a received sequence of the second plurality of option messages.

15. The method of claim 12, further comprising a step of determining a numerical sequence for presenting each of option messages of the second plurality of options messages.

16. The method of claim 11, further comprising a step of confirming the second plurality of option messages prior to the step of presenting the second plurality of option messages.

17. The method of claim 11, wherein the first plurality of option messages includes a predetermined presentation order.

18. The method of claim 17, wherein the predetermined presentation order is changed according to a received sequence of the second plurality of option messages.

19. The method of claim 11, wherein the caller-initiated selection comprises a verbal input.

20. The method of claim 19, further comprising a step of parsing the verbal input.

21. In an interactive voice response system, a method of processing a telephone call, comprising the steps of:
   receiving the telephone call from a caller;
   responsive to receiving the telephone call, transmitting to the caller a plurality of option messages for a menu level of a menu hierarchy, the option messages having a first presentation order;
   monitoring the telephone call for a caller-initiated signal to create a second presentation order comprised of the option messages of the menu level;
   responsive to the caller-initiated signal, receiving a caller selection of the option messages to be included in the second presentation order; and
   transmitting to the caller the caller selection of the selected option messages based on the second presentation order.

22. The method of claim 21, wherein the interactive voice response system is network-based.

23. The method of claim 22, further comprising a step of including implicit menu options in the second presentation order.

* * * * *